United States Patent [19]

Jourde et al.

[11] Patent Number: 4,545,352
[45] Date of Patent: Oct. 8, 1985

[54] ELECTROMAGNETIC CONTROL INJECTION SYSTEMS FOR DIESEL ENGINES OF THE PRESSURE-TIME TYPE WHERE THE INJECTOR NEEDLE IS CONTROLLED BY THE CHARGING AND DISCHARGING OF A CHAMBER

[75] Inventors: Jean-Pierre Jourde, Lyons; Pedro Cmapo-Garraza, Caluire; Marc Miettaux, Decines; Thierry Michaux, Sainte Foy les Lyon, all of France

[73] Assignee: Regie Nationale des Usines Renault, Boulogne-Billancourt, France

[21] Appl. No.: 581,830

[22] Filed: Feb. 21, 1984

[30] Foreign Application Priority Data

Feb. 21, 1983 [FR] France .............................. 83 02792

[51] Int. Cl.⁴ .......................................... F02M 39/00
[52] U.S. Cl. .................................... 123/447; 123/467;
 123/458; 123/501
[58] Field of Search ............... 123/447, 467, 501, 500,
 123/458, 506

[56] References Cited

U.S. PATENT DOCUMENTS

| | | | |
|---|---|---|---|
| 3,810,453 | 5/1974 | Wolfe | 123/447 |
| 4,036,192 | 7/1977 | Nakayama | 123/467 |
| 4,161,161 | 7/1979 | Bastenhof | 123/447 |
| 4,211,202 | 7/1980 | Hafner | 123/467 |
| 4,359,032 | 11/1982 | Ohie | 123/467 |
| 4,440,132 | 4/1984 | Terada | 123/467 |

FOREIGN PATENT DOCUMENTS 2190167 1/1974 France .............................. 123/458

*Primary Examiner*—Carl Stuart Miller
*Attorney, Agent, or Firm*—Oblon, Fisher, Spivak, McClelland & Maier

[57] ABSTRACT

Improvements in electromagnetic control injection systems for diesel engines of the pressure-time type where the injection needle is controlled by the discharging then charging of a chamber. Electromagnetic control fuel injection system for diesel engines in which a three-way solenoid valve is placed in the injection holder, the injector needle being controlled during its opening by the pressure drop of the fuel contained in the control space. A disc having a nozzle is used to throttle the passage assuring the pressure drop in the control chamber without throttling the passage during a rise in pressure so that the injector needle begins to move only after the complete movement of the solenoid valve.

4 Claims, 8 Drawing Figures

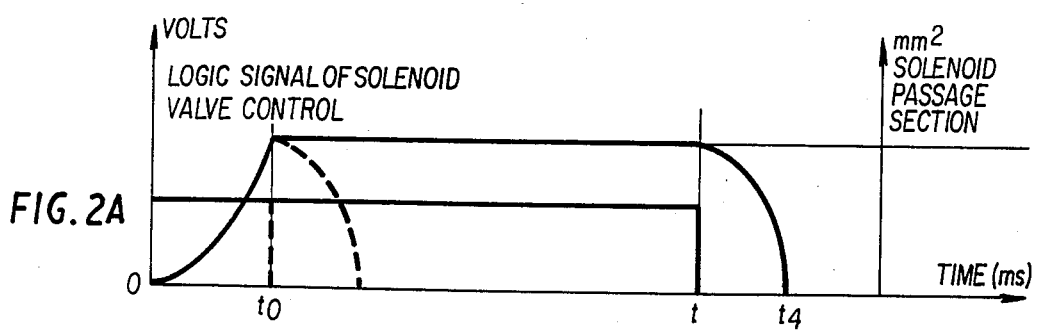
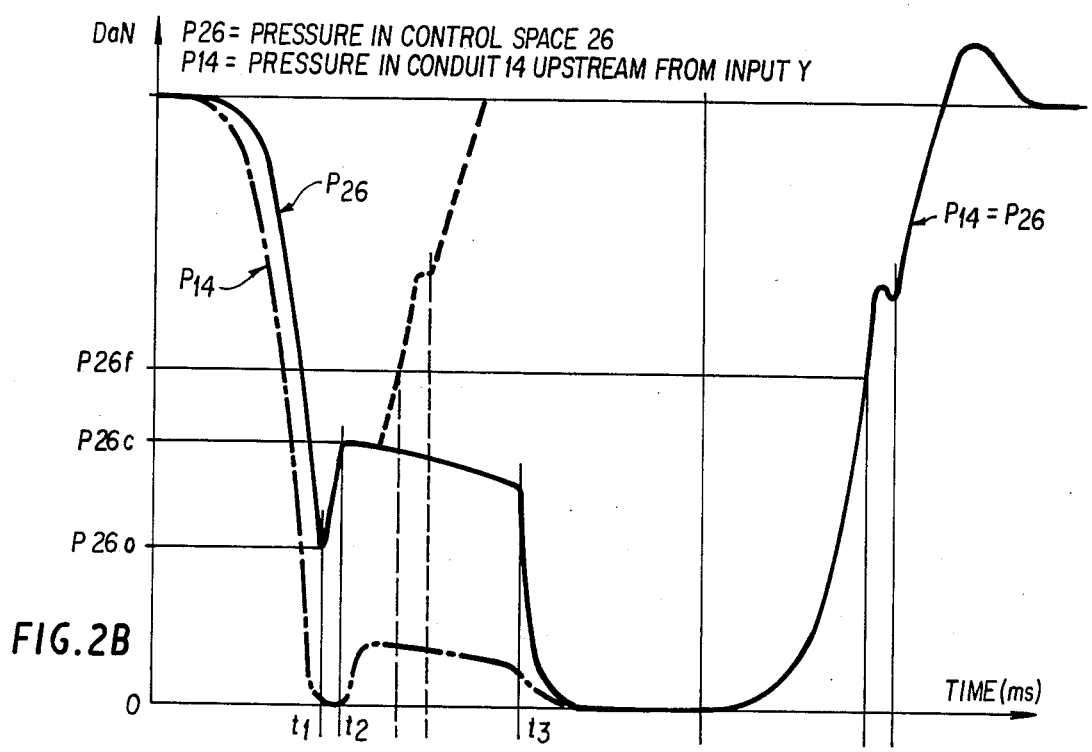
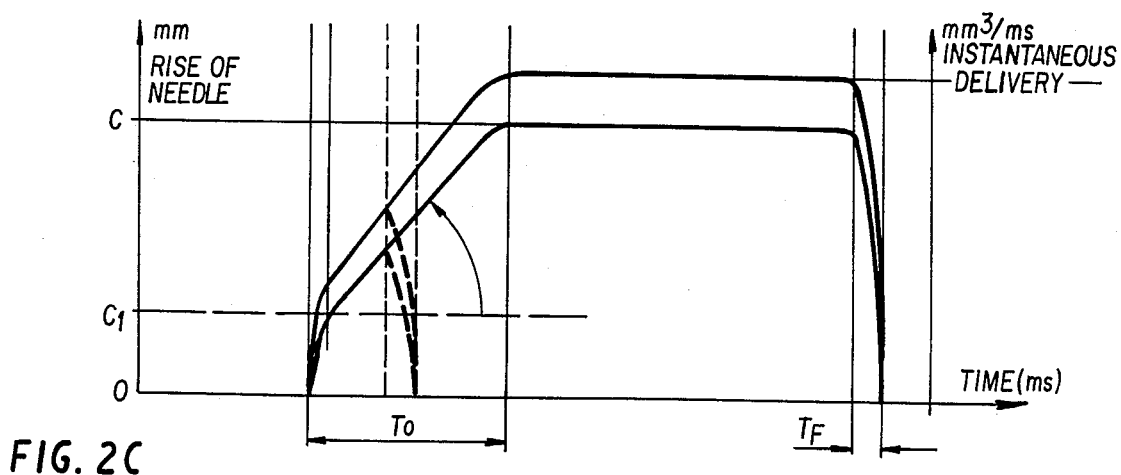

ELECTROMAGNETIC CONTROL INJECTION SYSTEMS FOR DIESEL ENGINES OF THE PRESSURE-TIME TYPE WHERE THE INJECTOR NEEDLE IS CONTROLLED BY THE CHARGING AND DISCHARGING OF A CHAMBER

BACKGROUND OF THE INVENTION

1. Field of the Invention

This invention relates to improvements in electromagnetic control fuel injection valves for internal combustion engines, particularly diesel engines, in which the injector needle or injection nozzle is opened by the pressure drop in a control chamber by means of a discharge conduit and closed by repressurizing the chamber. The discharging and charging of the fluid in the chamber is performed with a three-way solenoid valve.

2. Description of the Prior Art

Fuel injection valves are ordinarily be called "constant pressure injector" valves when the pressure that constantly prevails upstream from the seat of the injection needle of the valve allows the needle to rise when the control chamber, located above said needle, is discharged. Numerous examples of such injection systems are known but they are subject to two main criticisms.

First, these injection systems used on direct injection engines often give rise to a very noisy combustion. The gradient of instantaneous delivery or rate of introduction is very high from the start of injection since the constant high pressure is immediately present upstream from the fuel injection ports, which results in the introduction of a large quantity of fuel in the combustion chamber before start of ignition; the fuel in the cylinder at the moment of ignition being present in a greater quantity than in a conventional injection system, the gradient of the cylinder pressure is very high at the start of combustion, which results in noisy combustion.

Further, the control of a three-way solenoid valve is generally such that opening of the injector needle is often dependent upon the movement of the solenoid valve, which causes difficulties in the ability to control a stable, repetitive dosing of very small injected quantities.

SUMMARY OF THE INVENTION

The aim of the invention is to eliminate the above drawbacks by making it possible, on the one hand, to modulate the law of injection and transform it into a trapezoidal law instead of a nearly rectangular law and, on the other hand, to assure a complete control of small injected quantities, even allowing preinjection, i.e., allowing the injector to operate twice for the same injection, a first time before the ignition period to introduce a very small quantity of fuel, and a second time to allow the introduction of the major portion of the fuel, the second introduction starting almost in phase with ignition.

For this purpose, the invention provides joining to the device a device to throttle the passage assuring the pressure drop in the control chamber without throttling the passage during a rise in pressure so that the injector needle starts to move only after the complete movement of the solenoid valve.

BRIEF DESCRIPTION OF THE DRAWINGS

Other features of the invention will become apparent in view of the following description of an embodiment taken as an example and shown in the accompanying drawings in which:

FIGS. 2a, 2b and 2c respectively show curves of pressure and needle movement variation as a function of the time of the control voltage of the solenoid valve.

DETAILED DESCRIPTION OF THE PREFERRED EMBODIMENTS

Figure 1:
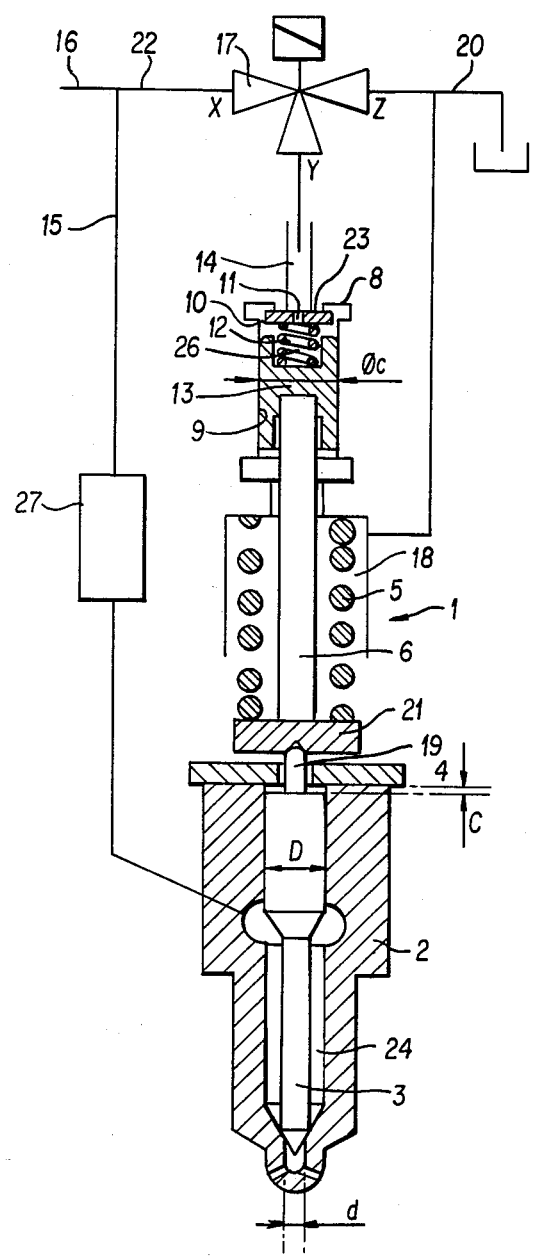
FIG. 1 is a schematic illustration corresponding to one of the injectors.

As shown in FIG. 1, the device consists, in a conventional way, of a body 1, not described in detail, in which a conventional injector 2 and its needle 3 can be mounted. A block 4 is positioned so as to be a stop for the needle 3. Body 1 is designed to receive a three-way solenoid valve 17 and it further includes a bore 9 in which a piston 13 is mounted. A housing 18 fitted in body 1 extends along the axis of the bore 9, enabling it to receive a spring 5, called a calibration spring, which rests on the upper bottom of housing 18 and acts on a collar 21 fixed to a push rod 6, and which thrusts on the top 19 of needle 3 of injector 2. Top 8 of bore 9 is especially designed, on the one hand, to communicate via conduit 14 with output Y of three-way solenoid valve 17 and, on the other hand, to form a support for a disc 10, pierced with a nozzle 11 and which, in rest position, rests on a plane bearing surface 23, extending perpendicular to the axis of said bore 9, thanks to a spring 12 resting on the specially disigned head of piston 13.

Body 1 also has an intake conduit 16 through which the fuel is delivered under constant high pressure, this pressure being supplied by a pump and pressure regulator system, not shown here. Two branch conduits go off from conduit 16, a first branch conduit 22 connected to the three-way solenoid valve by its intake conduit X and a second branch conduit 15 in fluid communication with chamber 24 located around needle 3 in injector 2.

Body 1 further includes a conduit 20 connected to the tank return and which, by connection with output conduit Z of the three-way solenoid valve and conduit 25, is connected to chamber 18. Finally, to understand its functioning, it is also necessary to specify that solenoid valve 17 is so designed that in rest position, i.e., not electrically energized, conduits X and Y are directly connected, allowing the fuel under pressure to enter body 1 by conduit 16 to and conduit 14. In the electrically energized position of the solenoid valve 17 input conduit X is blocked, while conduits Y and Z are connected, allowing communication between conduit 14 and return conduit 20.

Further, body 1 is specially designed to define a chamber 27 in series with chamber 24 in conduit 15 and placed, depending on the design of injector 2, as close as possible to chamber 24 located around needle 3.

Functioning will be better understood from FIGS. 2a to 2c. The system being at rest under pressure P, needle 3 rests on its seat with a force $f_r$ so that $$f_r = F_R + \pi/4 \phi_c^2 \cdot P - \pi/4(D^2 - d^2)P$$

$F_R$ being the force of the spring, d and D the respective diameters of the needle at its seat and its guide and $\phi_c$ the diameter of piston 13, known as the control piston.

This balance can be achieved because, along with the presence of fuel under high pressure in chamber 24, the same high pressure P is established in control chamber 26 formed by the top of piston 13 and the upper surface of bore 19. Theoretically, to this force fr should be added the force developed by spring 12 but the latter develops negligible forces in comparison with $F_R$ and the effects of the pressure on piston 13.

When a current is established in the windings of solenoid valve 17, injection takes place as follows:

1. The solenoid valve has the role of blocking the passage of the fuel from X to Y and allowing the fuel to go from Y to Z; therefore because of the increase in the passage section from Y to Z, the pressure in conduit 14 drops, 2. Because of nozzle 11 made in disc 10, the pressure in control chamber 26 drops relatively slowly, and when this pressure reaches a value $P_{26,0}$, so that $$\pi/4\phi_c^2 P_{26,0} = \pi/4(D^2 - d^2)P - F_R$$

i.e., when the forces on mobile parts 3, 6 and 13 are in balance, the injector needle begins to open.

3. As soon as the needle rises a slight height, its movement is accelerated by an additional force equal to $\pi/4 d^2 P$ due to the pressure on the surface of its seat.

4. As in the functioning of an injector needle of a conventional injection system, this force should accelerate the injector needle very rapidly, but nozzle 11 of disc 10 is judiciously given dimensions to throttle the delivery of the fuel discharged from chamber 26, i.e., from time $t_1$ to time $t_2$, as can be seen in FIGURE a travel of the needle corresponding to $C_1$ and of piston 13, compresses the volume of chamber 26. The delivery of fuel through nozzle 11 limits the speed of displacement of the unit consisting of needle 3, push rod 6 and piston 13. After the very rapid rise from $t_1$ to $t_2$, there is thereafter a much slower rise from $t_2$ to $t_3$, slope $\alpha$ the curve of the rise of the needle as a function of time being easily modulated by adjustment of the diameter of nozzle 11: the smaller nozzle 11, the smaller angle $\alpha$ will be, and the greater it is, the faster the rise of the needle.

As a consequence of the above, it is possible to understand the very great importance of the volume of space 26 and the dimensions given to the various parts of the system, in particular the diameter of piston 13, for the above performances to be a function of diameters D and d of conventional injector needles on the market.

5. Once the needle has risen, pressure P prevailing in space 26 drops to the discharge pressure.

At the end of the injection, the energizing of the solenoid valve is interrupted at time t and the fuel under high pressure going into the solenoid valve through X comes out through Y and is delivered through conduit 14 above disc 10. Spring 12 being very weak, it is immediately compressed and disc 10 comes to rest on the piston head totally opening the entire section of conduit 14 and thus allowing the high fuel pressure to be exerted over the entire surface of piston 13. When the pressure reaches such a level $P_{26,f}$ that:

$$\pi/4\phi_c^2 P_{26,f} + F_R + kC + \pi/4D^2 P$$

(k being the constant of the spring and C the rise of the injector needle), the injector begins to close, a closing that is very fast since the pressure in chamber 26 increases very fast, the full section of passage of the solenoid valve from X to Y being open.

It can further be seen that if the solenoid valve is energized during a time t corresponding only to its response time, i.e., such a time that it can open fully then immediately close, it is possible to control very short rises of the needle corresponding to very small injected quantities, provided that the performance of the solenoid valve type used is sufficient and the entire system is judiciously given dimensions so that the injector needle begins its movement only after the movement of the solenoid valve itself.

It can be seen in FIG. 2c that time To of opening of injector needle 3 is greater than time $T_F$ of closing said needle. This is the characteristic of a positive "zero" system, i.e., whose characteristic delivery curve per stroke as a function of the opening time for said delivery is linear outside of its ballistic part, and the extension of said linear part intersects the time axis at a positive value. Actually, it is known that only systems having such a dynamism can allow very small, stable, repetitive deliveries.

FIG. 2b shows the course of pressure $P_{14}$ in conduit 14 upstream from input Y of the solenoid valve. It can be seen that although this pressure drops faster than pressure $P_{26}$ on opening of the injector, it is merged with $P_{26}$ on closing of the injector needle.

From the above description, it is possible to simplify, in a first approximation, the movement of the needle by stating that the movement of the needle is a function directly dependent on delivery rate of fuel q which goes into nozzle 11 during opening of the injector needle. This delivery rate has the form:

$$q = \beta S \sqrt{\frac{2(P_{26} - P_{14})}{\rho}}$$

$\beta$ being the delivery coefficient of nozzle 11 of section S and $\rho$ the density of the fuel, itself a function of the temperature and pressure of the fuel. Therefore, it can be seen that by varying section S of nozzle 11, slope $\alpha$ of the curve of the rise of the needle can be easily varied, which modifies the instantaneous delivery or rate of introduction at the beginning of the injection.

FIGS. 3a to 3d illustrate the application of the invention to a system of the type that uses preinjection, which is particularly suitable since the invention makes it possible to perfectly control the dosing of small injected quantities and to do so very quickly. The theory and technique of preinjection are known but difficult to achieve with a mechanical system. Its functioning can be summed up simply by saying that first a small quantity q of fuel is injected, with a conventional adjustment of spark advance, then, as soon as this small quantity is ignited, the main quantity Q of fuel is injected very rapidly, i.e., the main injection takes place after the start of the first injection, the time between the start of the two injections being on the order of magnitude of the ignition period, i.e., for private automobiles and industrial vehicles, a period on the order of 400 to 600 microseconds, a time that quite obviously is a function of load conditions and speed of the engine.

Figure 3A:
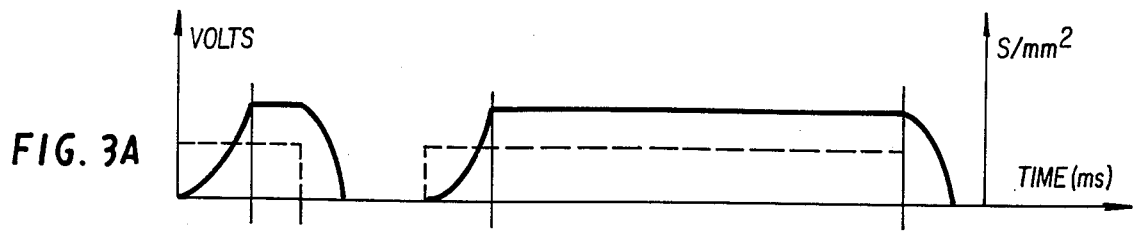
FIGS. 3a, 3b, 3c and 3d respectively show curves of variations of the control voltage and current, pressures and rise of the needle in the case of injection with preinjection.

FIG. 3a shows the control signals of the solenoid valve and the evolutions of its passage sections.

Figure 3B:
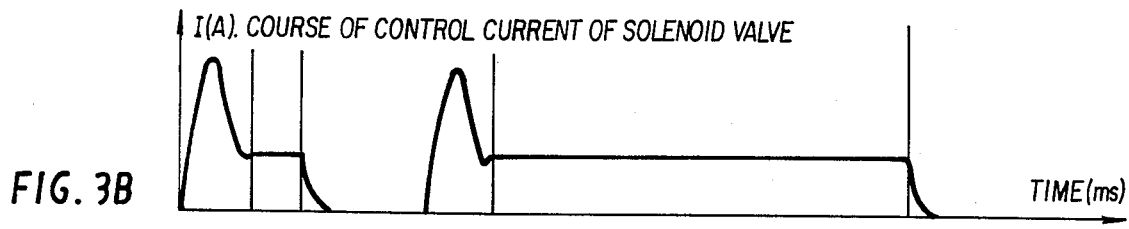

FIG. 3b shows a possible course of the control current of the solenoid valve.

Figure 3C:
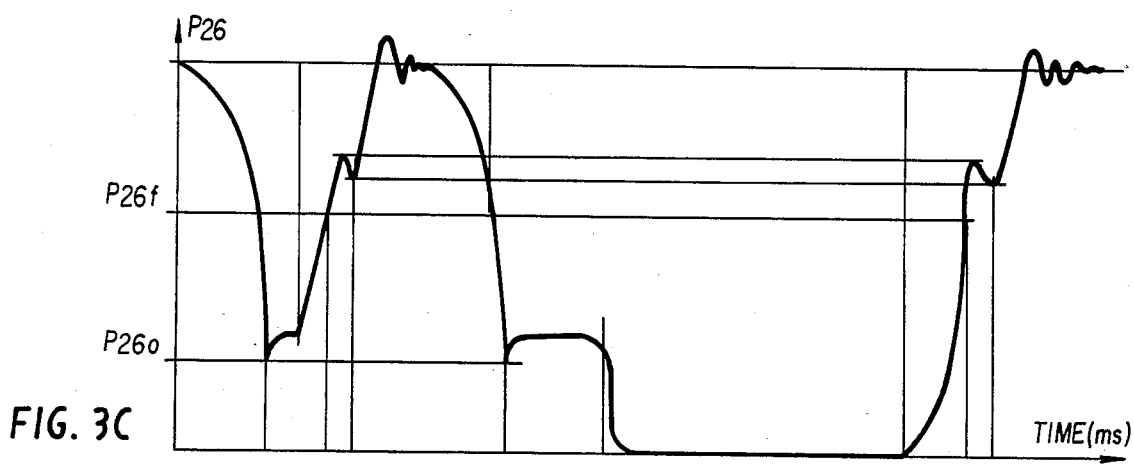
Figure 3D:
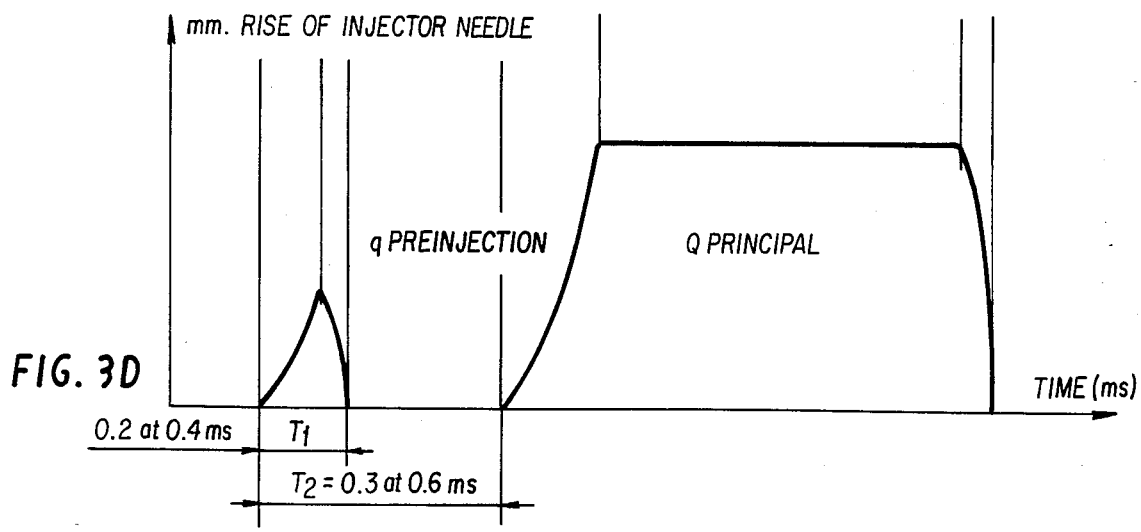

FIG. 3c gives the pressure variation in the control chamber 26, and FIG. 3d gives the corresponding movements of the needle from which the rate of introduction can be deduced simply by analogy with FIG. 2c.

For this use, it is advantageous to have the main injection Q as rectangular as possible to inject the main quantity very quickly. Nozzle 11 of disc 10 should then be large enough for slope α to be high. It should be noted that, to guarantee a stable functioning even under this operating condition, the solenoid valve is always fully open before the beginning of the rise of the needle. Further, body 1 is specially designed with a space 17 which has the role of minimizing the fuel pressure drop on opening of the injector and damping the hammering phenomenon on successive openings and closings of the injector needle.

Obviously, numerous modifications and variations of the present invention are possible in light of the above teachings. It is therefore to be understood that within the scope of the appended claims, the invention may be practiced otherwise than as specifically described herein.

We claim:

1. An electromagnetic fuel injection system for a diesel engine, comprising:
    a fuel injector having a needle movable between an open position and a closed position for said fuel injector;
    means for moving said needle from said open to said closed position, said means for moving including a piston movable with said needle and a first fluid chamber communicating with said piston such that a fluid pressure in said first fluid chamber acts to move said piston toward a first position corresponding to said closed position;
    means for moving said needle from said closed position to said open position;
    means for controlling a rate of movement of said needle from said closed position to said open position;
    a three-way solenoid valve having a first port communicating with a source of pressurized fuel, a second port communicating with a fluid bypass and a third port, said three-way solenoid valve being positionable in a first position wherein said first and third ports are in communication, and a second position wherein said second and third ports are in communication;
    first conduit means connecting said third port with said first fluid chamber, said first conduit means including means defining first and second alternate parallel fuel flow paths, said first flow path defining a restriction in comparison to said second flow path and constituting said means for controlling, said second flow path being constructed so as to be open only for flow into said first fluid chamber;
    wherein said means defining first and second alternate parallel flow paths comprises:
    a valve element having a pressure loss circuit therein; and
    means for biasing said valve element into a position closing said first conduit means with only said pressure loss circuit communicating said first conduit means with said first fluid chamber so as to define said first flow path, wherein pressurized fuel from said three-way valve moves said valve element away from said position closing said first conduit means so as to define said second flow path,
    and wherein said piston and valve element are constructed so as to minimize the volume of said first fluid chamber.

2. The system of claim 1 wherein said pressure loss circuit is a nozzle extending through said valve element, said nozzle having a diameter determined as a function of a desired injection loss.

3. The system of claim 1 wherein said means for moving said needle from said closed position to said open position includes:
    a second fluid chamber surrounding said needle for holding fuel to be injected by said injector;
    second conduit means communicating said source of pressurized fuel with said second fluid chamber; and
    a damping chamber in said second conduit means and positioned as close as possible in a fuel flow direction to said second fluid chamber.

4. The system of claim 1 wherein said means for controlling is dimensioned such that when said system operates with preinjection, the start of the main injection can occur between 400 and 600 microseconds after the start of preinjection.

* * * * *